(12) United States Patent
Chaoua et al.

(10) Patent No.: US 9,863,620 B2
(45) Date of Patent: Jan. 9, 2018

(54) CONTROLLER FOR A LUMINAIRE

(71) Applicant: GE Lighting Solutions, LLC, East Cleveland, OH (US)

(72) Inventors: Youcef Chaoua, Montreal (CA); Louis Bacon, Montreal (CA); Eric Lavigne, Montreal (CA); David Joseph Tracy, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 157 days.

(21) Appl. No.: 14/947,692

(22) Filed: Nov. 20, 2015

(65) Prior Publication Data

US 2017/0146223 A1    May 25, 2017

(51) Int. Cl.
*H05B 37/02* (2006.01)
*F21V 23/00* (2015.01)

(52) U.S. Cl.
CPC ....... *F21V 23/003* (2013.01); *H05B 37/0218* (2013.01); *H05B 37/0245* (2013.01)

(58) Field of Classification Search
CPC ....... F21V 23/06; F21V 23/003; B44C 5/005; H05B 37/02; H05B 37/0218; H05B 37/0245; H05B 33/08; H05B 33/0845; H05B 33/086; H05B 37/0254; H05B 37/0272; H04L 67/18; H04L 67/025; H04L 41/0853; G06F 13/4072; G06F 13/4045

USPC ................ 315/291, 307, 308, 312, 151–158
See application file for complete search history.

(56) References Cited

U.S. PATENT DOCUMENTS 7,529,594 B2   5/2009  Walters et al.
9,565,732 B2 * 2/2017  Ryhorchuk ........ H05B 37/0254

FOREIGN PATENT DOCUMENTS

DE   202014008219 U1 *  3/2015  ........... H05B 33/086
DE   202014008219 U1     4/2015
WO     2013159833 A1    10/2013

OTHER PUBLICATIONS

XP-002767845 / ANSI C136.41-2013 Dimming Receptacles.*
"ANSI C136.41/2013 Dimming Receptacles", XP002767845, Apr. 21, 2015.
European Search Report and Opinion issued in connection with corresponding EP Application No. 16198893.6 dated Apr. 11, 2017.

* cited by examiner

*Primary Examiner* — Jimmy Vu
(74) *Attorney, Agent, or Firm* — Peter T. DiMauro; GE Global Patent Operation

(57) ABSTRACT

Provided is a controller for use with a luminaire. The controller that includes a processor connected to at least one lead of a receptacle included in the luminaire. The processor can be programmed to multiplex at least one lead of the receptacle to achieve at least one of a plurality functions.

13 Claims, 6 Drawing Sheets

CONTROLLER FOR A LUMINAIRE

TECHNICAL FIELD

The present disclosure generally relates to luminaires. More particularly, the present disclosure relates to controllers for luminaires.

BACKGROUND

Advanced functionalities are sought to be added to luminaires, partly due to the advent of Internet of Things (IoT) technologies. Such functionalities include online monitoring of luminaire data, such as lumen output, calibration data, power delivery, metering data, ON & OFF schedules, maintenance records, location data, etc. Furthermore, these new functionalities can include providing support or control of nearby devices, such as transferring and/or receiving data from parking meters to detect presence of absence of parked cars, monitoring, controlling, and processing data from cameras, for security or pedestrian traffic management applications. In sum, IoT technologies will bring forth the age of the "smart luminaire," which will be only one of many aspects of new "smart cities."

Nevertheless, manufacturing and deploying such smart luminaires may be highly cost-prohibitive, or in some instances, the cost of manufacturing and deploying such luminaires may not scale favorably. This is partly due to the fact that for each additional functionality desired, a specific luminaire having the hardware capable of supporting the additional functionality must be manufactured. This leads to increased product skews, which in turns increases manufacturing costs and complexity.

SUMMARY

The embodiments featured herein help solve or mitigate the above-noted issues as well as other issues known in the art. Specifically, the embodiments confer the ability to provide additional functions to a luminaire platform. As such, luminaires having a wide variety of functionalities can be manufactured without having a different product skew (or version) for every additional functionality that is implemented or desired.

For example, in one embodiment, there is provided a light controller for use with a luminaire. The light controller can include a processor connected to at least one unassigned lead of a receptacle included in the luminaire. Furthermore, the processor can be programmed to multiplex at least one lead to achieve at least one of a plurality functions.

In another exemplary embodiment, there is provided a method for use with a luminaire. The method can include providing a controller at a lighting controller receptacle of the luminaire. The method can further include multiplexing at least one unassigned lead of the lighting control receptacle to achieve at least one of a plurality of functions.

In yet another exemplary embodiment, there is provided a non-transitory computer-readable medium for use with a luminaire. The computer-readable medium can include instructions that, when executed by a processor, cause the processor to perform operations that include multiplexing at least one unassigned lead of a lighting control receptacle included in the luminaire to achieve one at least one of a plurality of functions.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
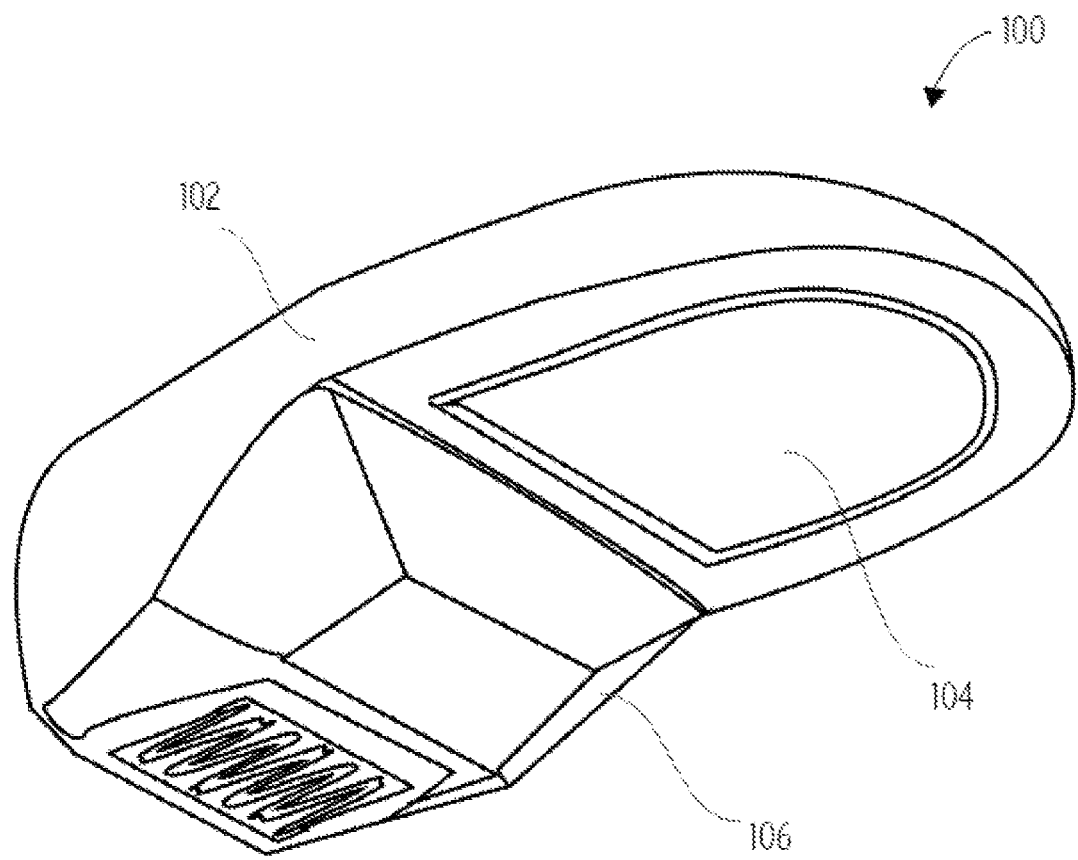
FIG. 1 is an illustration of a luminaire in which embodiments of the invention may be practiced.

FIG. 1 is an illustration of a luminaire 100 in which embodiments of the invention may be practiced. Luminaire 100 includes a dorsal portion 102 onto which is mounted a light receptor receptacle (not shown). Luminaire 100 further includes a cavity in which are placed light sources, such as light emitting diodes, for example. The cavity may be covered with a transparent glass 104 that serves to protect the light sources from the elements. In some embodiments, glass 104 may also function as a lens.

While luminaire 100 is shown as a platform in which the invention may be practiced, the invention is not limited to luminaires. Any device that uses a receptacle to interface a controller to the device is contemplated. For example, and not by limitation, any device that utilizes an ANSI 7-pin receptacle may be used. One such device is, for instance, a traffic light system that utilizes an ANSI 7-pin receptacle to interface with a traffic light controller.

Luminaire 100 can further include a section 106 that is reserved for a wide variety of additional components. For example, section 106 may have a transparent cover and include cameras. Furthermore, in other embodiments, section 106 can include global positioning system (GPS) hardware.

Figure 2:
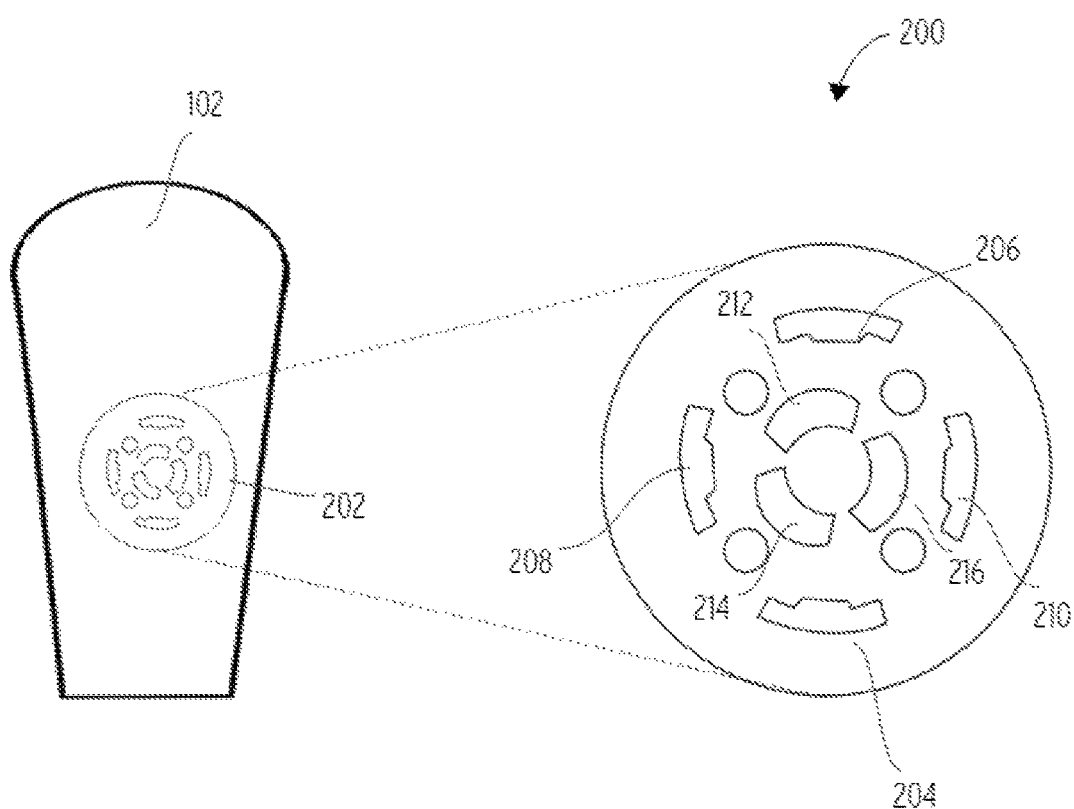
FIG. 2 is a top view of the luminaire of FIG. 1, according to an embodiment.

FIG. 2 is a top view 200 of luminaire 100. Specifically, top view 200 shows a lighting controller receptacle 202 disposed on the dorsal portion 102 of luminaire 100. Lighting controller receptacle 202 protrudes outward from the surface of dorsal portion 102 and it extend inward within the body of luminaire 100. Furthermore, on the inner side of lighting controller receptacle 202, i.e. the portion extending inward within the body of luminaire 100, there are disposed a plurality of leads.

In the exemplary embodiment shown in FIG. 2, lighting controller receptacle 202 includes a plurality of pins, which are pin 204, pin 206, pin 208, pin 210, pin 212, pin 214, and pin 216. Each of these pins is associated with one lead (not shown). Without loss of generality, hereinafter, a lead will be referred to with the numeral corresponding to the pin to which it is attached. For example, lead 210 will refer to the lead being attached to pin 210 on the inner side of the lighting controller receptacle 202.

Embodiments of the invention may include any controllers that interface through the standard lighting control receptacle of a luminaire, such as lighting controller receptacle 202. In some embodiments, lighting controller receptacle 202 may be defined using the ANSI C136.41 standard. That is, lighting controller receptacle 202 may have a 7-pin interface as shown in FIG. 2. Of the seven pins, three pins (212, 214, and 216) may be dedicated to providing power to a controller mounted on lighting controller receptacle 202. The remaining four pins may be dedicated to low-voltage signaling and control. For example, pin 204 and pin 210 may be dedicated to 0-10V dimming and/or DIGITAL ADDRESSABLE LIGHTING INTERFACE™ (DALI™), and pins 208 and 206 may be unassigned, i.e. they are optional according to the ANSI C136.41 standard; that is, they may be left for the manufacturer to define. Hereinafter, any optional pin or lead of lighting controller 202 may be referred to as an unassigned pin or lead.

Embodiments of the invention may be used (via hardware or software) to statically or dynamically configure the functionality/signal type that is present on pin 208 and pin 206. Specifically, more than two functions per unassigned pin can be multiplexed on each one of the assigned pins, using embodiments of the invention.

Figure 3:
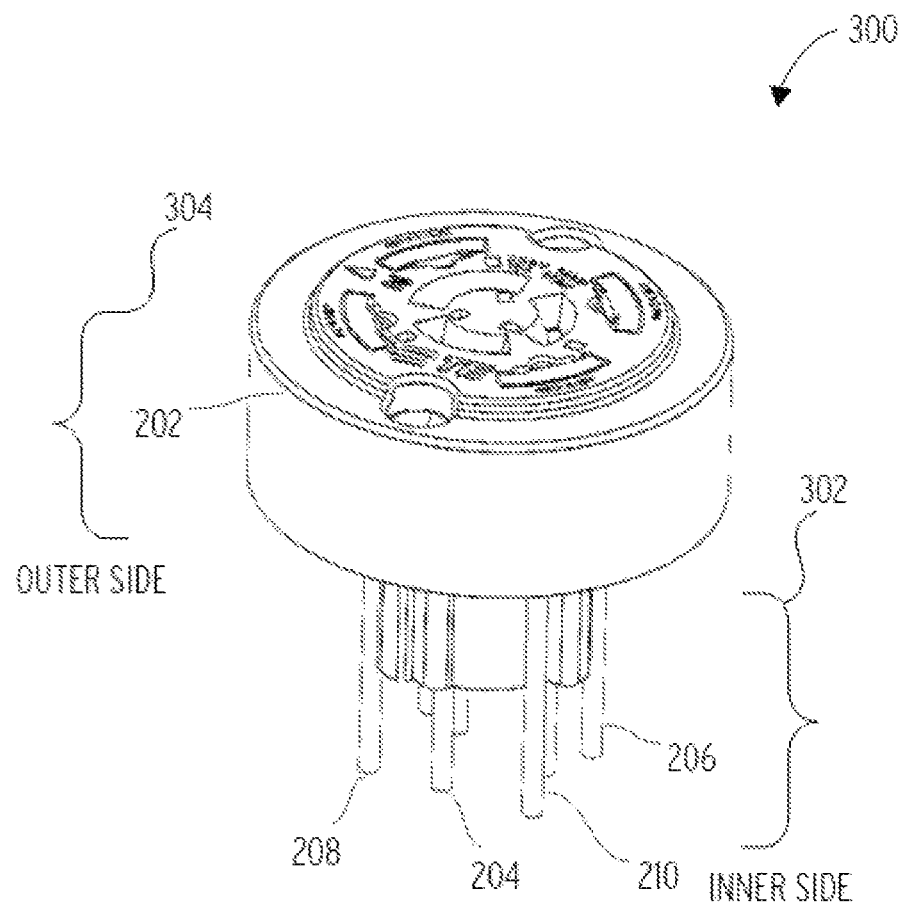
FIG. 3 is an illustration of a lighting controller receptacle, according to an embodiment.

FIG. 3 is an illustration of a perspective view 300 of lighting controller receptacle 202. Outer side 304 corresponds to the portion of lighting controller receptacle 202 that is outside luminaire 100, i.e. the portion that protrudes outward from dorsal portion 102 of luminaire 100. Similarly, inner side 302 corresponds to the portion of lighting controller receptacle 202 that extends within luminaire 100. Leads 208, 204, 210, 206 correspond respectively to pin 208, pin 204, pin 210, and pin 206.

Figure 4:
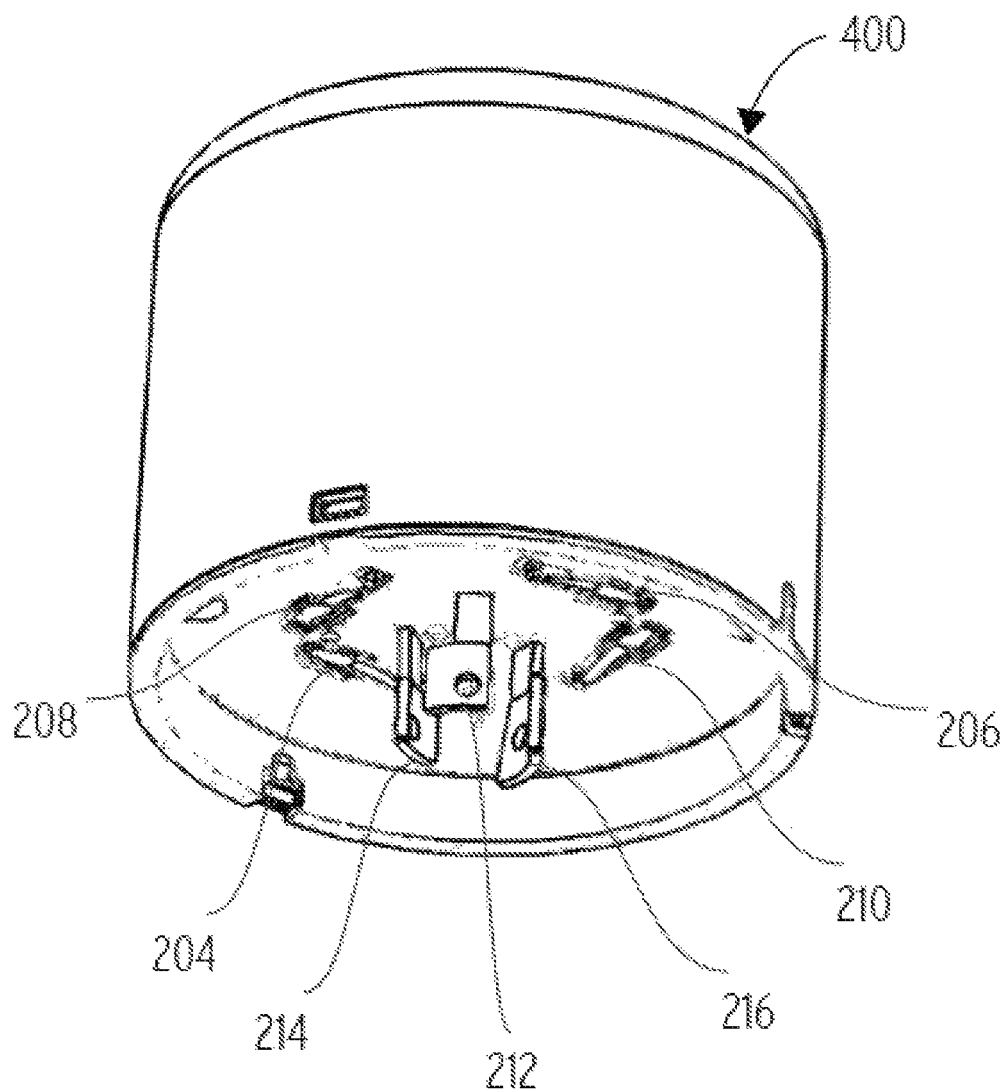
FIG. 4 is an illustration of a controller, according to an embodiment.

FIG. 4 is an illustration of a controller 400 according to an embodiment. Controller 400 includes pins 204, 206, 208, 210, 212, 214, and 216, each configured to interface to the corresponding pin referenced with the same number in lighting controller receptacle 202, as shown in FIG. 2.

Figure 5:
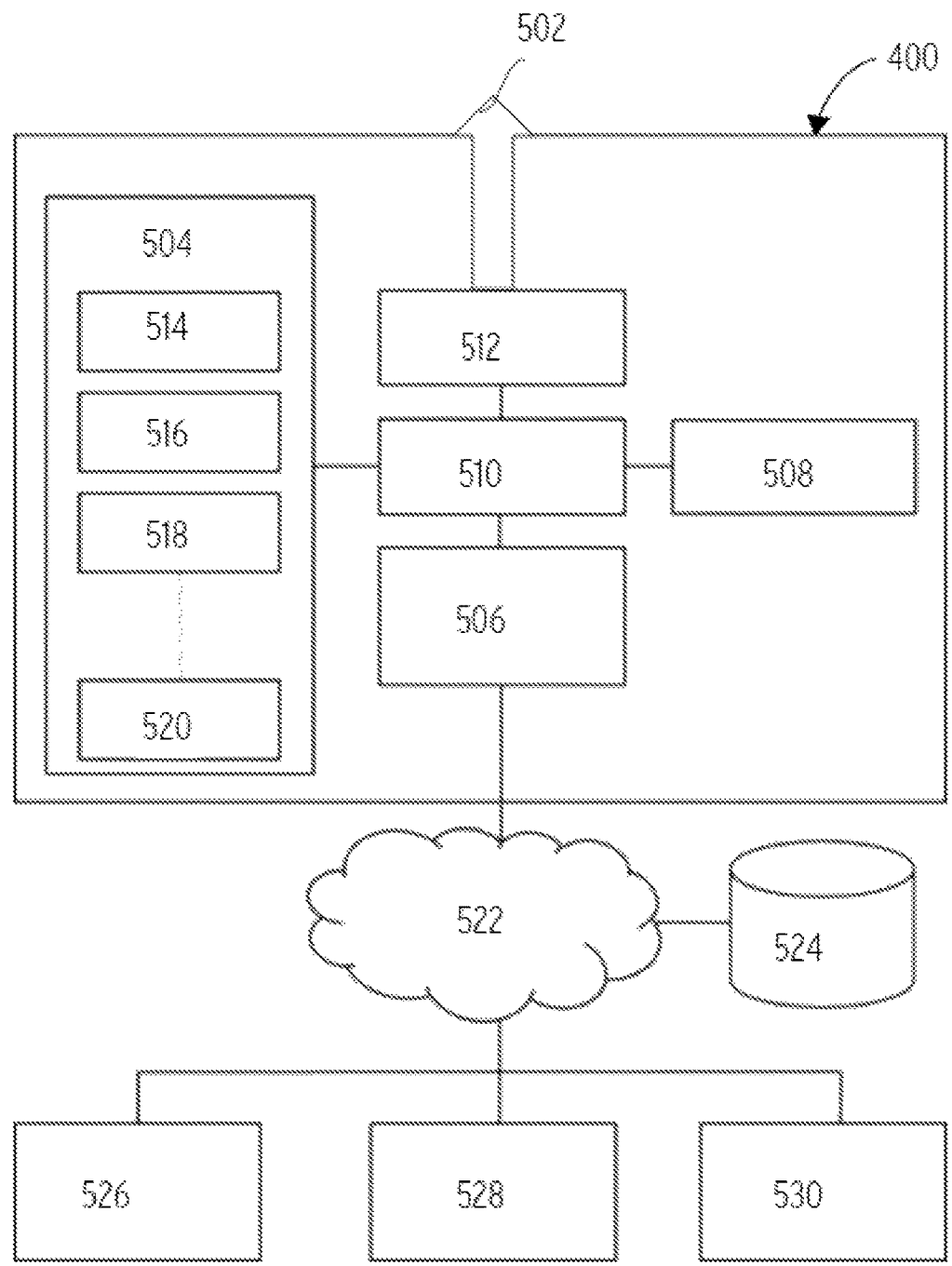
FIG. 5 is an illustration of a block diagram of a controller, according to an embodiment.

FIG. 5 shows a block diagram of controller 400. Furthermore, FIG. 5 depicts how controller 400 can interface with a database 524, a data center 526, a gateway device 528, and with a remote diagnostics device 530, all via network 522. One of ordinary skill in the art will readily appreciate that controller 400 can interface with a plurality of devices, which are not limited to those shown in FIG. 4.

Controller 400 can include a bus 502 adapted to interface with lighting controller receptacle 202. In other words, bus 502 can have a connector that is designed to mate with lighting controller receptacle 202, at least to provide an interface between controller 400 and the components of luminaire 100.

Controller 400 is a programmable device, or it may be a programmable module located in a much larger device. For example, controller 400 can be part of a node mounted on lighting controller receptacle 202, the node having a plurality of functionalities. For example, the node may include a photo-electric element configured to sense ambient light and provide dimming commands to the luminaire, based on predetermined ambient light level thresholds.

Furthermore, the node may include wireless communication hardware, or communication hardware that use power line communication protocols. Furthermore, the node can include hardware for controlling one or more cameras located in luminaire 100, in addition to hardware capable of processing and transmitting data from the one or more cameras. One of skill in the art will readily recognize that such a node may have additional functionalities/hardware beyond those described herein.

Controller 400 may include one or more hardware and/or software components configured to fetch, decode, execute, store, analyze, distribute, evaluate, and/or categorize information. Furthermore, controller 400 may be battery-powered or it may include a power supply specifically suited for drawing power from a powerline or from a power supply of luminaire 100.

Controller 400 may be configured to function as a client device communicatively coupled to one or more devices via network 522. Such devices may be, for example, and not by limitation, database 524, data center 526, gateway device 528, and remote diagnostics device 530.

Controller 400 can be communicatively coupled to a database 524 via a network 522 using a communication network interface 506. In some embodiments, controller 400 may fetch instructions from database 524 and/or use database 524 as a storage medium to log operational parameters, measurements, configuration, and/or any other data pertinent to the functions of controller 400 and/or to the functions and/or status of luminaire 100.

Communication network interface 506 may include one or more components configured to transmit and receive data via communication network 522, such as one or more modulators, demodulators, multiplexers, de-multiplexers, network communication devices, wireless devices, antennas, modems, and any other type of device configured to enable data communication via any suitable communication network.

Furthermore, network 522 may be any appropriate network allowing communication between or among one or more computing systems or utility system, such as, for example, the Internet, a local area network, a power-line communication network, a telephone network, a wireless network, or a wide area network.

Controller 400 can include one or more processors 510, a storage device 508, a memory 504 or the like, and input/output hardware (I/O module 512) configured to interface with bus 502 and lighting controller receptacle 202 (not shown in FIG. 5).

Processor 510 may include one or more processing devices or cores (not shown). In some embodiments, processor 510 may be a plurality of processors, each having either one or more cores. Processor 510 can be configured for execution of instructions fetched from memory 504, for example from memory block 520, or fetched from storage device 508, or from a remote device connected via network 522. In the latter case, the instructions may originate from any one of database 524, data center 526, gateway device 528, and remote diagnostics device 530.

For example, and not by limitation, memory 504 or storage device 508 may include instructions, which when executed by processor 510, cause processor 510 to fetch, decode, and execute instructions from database 524. Or the instructions may be obtained from a server located at data center 526, which can be a part of a control infrastructure designed to monitor, control, and manage a plurality of luminaires like luminaire 100, each being fitted with controllers such as controller 400.

Alternatively, in some embodiments, the instructions may originate from gateway device 528, which can be an intermediate device connected to a plurality of luminaires like luminaire 100, each being fitted with controllers such as controller 400. Further, gateway device 528 may serve as an interface between the plurality of luminaires and a single data center, such as data center 526.

Yet in other embodiments, instructions may be fetched from remote diagnostics device 530, which can be, for example, a device operated by a service technician.

Furthermore, without loss of generality, storage device 508 and/or memory 504 may include a volatile or non-volatile, magnetic, semiconductor, tape, optical, removable, non-removable, read-only, random-access, or other type of storage device or non-transitory computer-readable computer medium. Storage device 508 and/or memory 504 may include programs and/or other information that may be used by processor 510. Storage device 508 may be configured to log data processed, recorded, or collected during the operation of controller 400. The data may be time-stamped, GPS-tagged, cataloged, indexed, or organized in a variety of ways consistent with data storage practice, and this without departing from the scope of the present disclosure.

The functionality of controller 400 is imparted by its structure. Namely, the structure of controller 400 is provided by the software or firmware contained in a plurality of memory sectors of memory 504, of which only memory block 514, memory block 516, memory block 518, and memory block 520 are shown for clarity.

These memory sectors can be pre-programmed with specific instructions, or they can be programmed via network 522 or even via e I/O module 512, or using a combination of some or all of the above-mentioned methods.

In some embodiments, for example, memory block 514 may include instructions that, when executed by processor 510, cause processor 510 to multiplex at least one lead of lighting controller receptacle 202, to which controller 400 is coupled via bus 502. The multiplexing of the lead may be used to achieve at least one function, otherwise unassigned to the lead. For example, multiplexing may include providing a primary function and a secondary function on the same lead, the two functions being distinct from one another. This example is by no means limiting, as in some embodiments, any arbitrary number of functions can be multiplexed on a single lead. Moreover, in some embodiments, multiplexing may be achieved dynamically or statically.

In other embodiments, processor 510 can be connected to only two leads of the receptacle, these leads being unassigned, wherein only these two leads are multiplexed by controller 400, each with at least one function. In some embodiments, lighting controller receptacle 202 can be implemented according to the ANSI C136.41 standard. And controller 400 can be used to multiplex each (or only one) of the unassigned leads in the ANSI C136.41 implementation of lighting controller receptacle 202.

One of ordinary skill in the art will readily recognize that although the ANSI C136.41 is disclosed herein as an exemplary implementation for lighting controller receptacle 202, the invention is not limited to luminaires that include receptacles implemented according to that standard. Rather, the invention may be practiced with any receptacle where one or more leads remain unassigned. In alternate embodiments, the invention may be used to multiplex a lead that is already assigned to a given function, to provide additional functionalities/signaling on that same lead.

Generally speaking, lighting controller receptacle 202 may include a first set of leads, wherein each lead is already assigned to one or more predetermined functions. These functions may be for example, power supply and regulation functions, dimming and/or DALI™ functions. Some of the assigned leads may be high voltage leads whereas the other assigned leads may be dedicated to low voltage signaling (such as the leads dedicated for dimming and DALI™ functions). Lighting controller receptacle 202 may additionally include a second set of leads that are unassigned.

For example, and not by limitation, lighting controller receptacle 202 can be a 7-lead interface, of which three leads are assigned to powering controller 400 when it is mounted on luminaire 100 via lighting controller receptacle 202, two other leads are assigned to dimming and/or DALI™ functions, and the remaining two leads are unassigned.

Processor 510 can be connected to at least one of the two remaining leads of the 7-lead interface. Functions multiplexed on the two unassigned leads can be any function. For instance, a function implemented on one of the unassigned leads can be associated with data transmission or reception. Such operations may be related to a global positioning system (GPS) node associated with luminaire 100. In other embodiments, the functions may be associated with controlling cameras mounted on, within, or in the vicinity of luminaire 100. Without loss of generality, the functions can be selected from the group consisting of data transmission functions and data reception functions or a combination of both transmission and reception. The functions can be implemented using high voltages or low voltages, with either analog or digital signaling or both.

Generally speaking, processor 510 may be configured to multiplex a given lead either using software or hardware. In the case of hardware, a multiplexing hardware known to those of ordinary skill in the art may be included in controller 400 to provide the multiplexing functions described above, under the control of processor 510.

In some embodiments, controller 400 may further include a USB interface or any other like interface for directly loading the instructions described above via a port of controller 400 to memory 504. Other such interfaces may include infrared (IR) data transceiver links or near-field communication (NFC) hardware.

The invention may further be embodied in computer program product, which may be a non-transitory computer-readable medium that include instructions that, when executed by processor 510, cause processor 510 to perform operations comprising at least multiplexing at least one lead of lighting controller receptacle 202 to achieve at least one or at least two of a plurality of functions.

Figure 6:
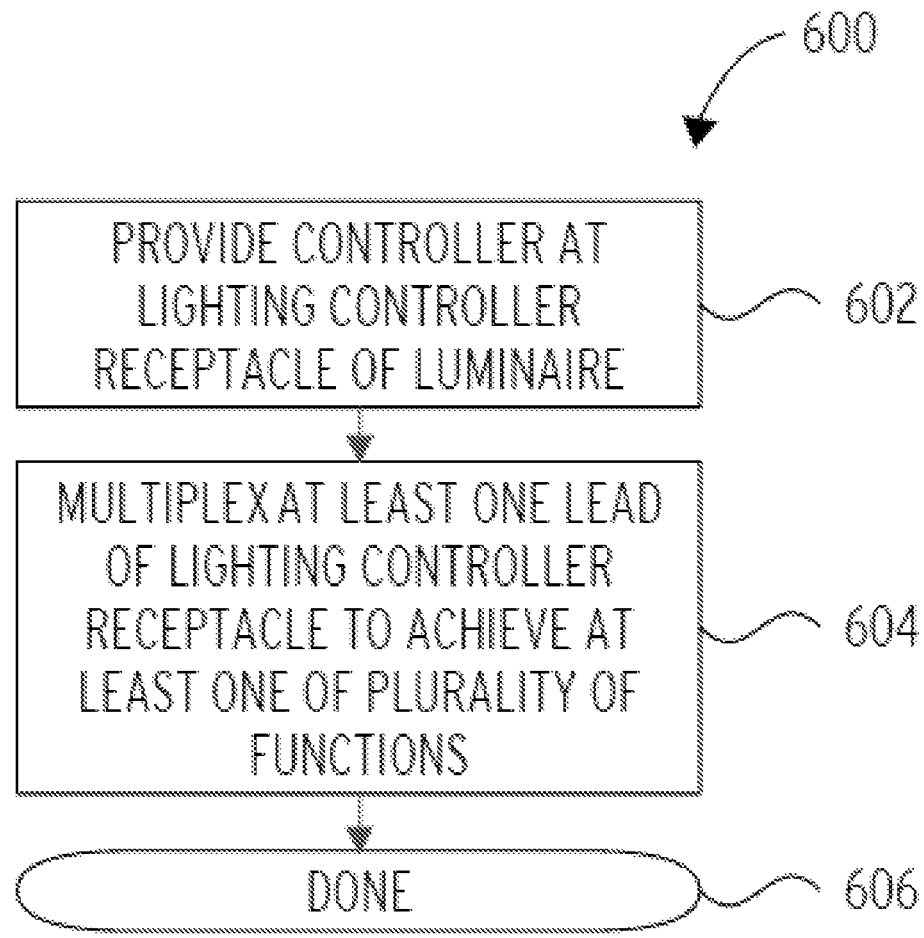
FIG. 6 depicts a flow chart of a method, according to an embodiment.

Having set forth the structure of various embodiments of the invention, an exemplary method 600 applicable to these embodiments is now described with respect to FIG. 6.

At step 602, method 600 includes providing a controller at a lighting control receptacle of the luminaire. The controller can be a controller like controller 400, and the lighting controller receptacle can be like lighting controller receptacle 202. Furthermore, in step 604, method 606 can include multiplexing at least one lead of the lighting control receptacle to achieve at least one of a plurality of functions. Method 600 ends at step 606.

In method 600, the lighting controller receptacle can be implemented according to the ANSI C136.41 standard. And the at least one lead can be selected from among two unassigned leads of the lighting controller receptacle, according to the ANSI C136.41 standard. Further, in method 600, multiplexing can be achieved dynamically or statically, using either hardware or software, or a combination of both.

Furthermore, the at least one of the plurality of functions can be selected from the group consisting of data transmission functions and data reception functions. Generally speaking, in method 600, the lighting controller receptacle can include a plurality of leads of which leads from a first set of leads are associated with one or more components of the luminaire and leads from a second set of leads are unassigned, and the at least one lead is selected from the second set of leads.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A light controller, for use with a luminaire, comprising:
a processor connected to at least one unassigned lead of a receptacle included in the luminaire,
wherein the processor is programmed to multiplex the at least one unassigned lead to achieve at least one of a plurality functions; and
wherein the light controller further comprises a memory comprising instructions, which when executed by the processor, cause the processor to multiplex the at least one lead.

2. The light controller of claim 1, wherein the processor is connected to two leads of the receptacle.

3. The light controller of claim 2, wherein the receptacle is implemented according to the ANSI C136.41 standard.

4. The light controller of claim 3, wherein the two leads are unassigned pins according to the ANSI C136.41 standard.

5. The light controller of claim 1, wherein the receptacle includes a first set of leads, each lead of the first set being assigned to one or more components of the luminaire, and a second set of leads, each lead of the second set being unassigned, and wherein the at least one unassigned lead is in the second set of leads.

6. The light controller of claim 1, wherein the receptacle is a 7-lead interface, of which three leads are assigned to power functions, two other leads are assigned to one of dimming or DALI™ functions, and wherein the processor is connected to at least one of the two unassigned leads of the 7-lead interface.

7. The light controller of claim 1, wherein the at least one of a plurality of functions is selected from the group consisting of data transmission functions and data reception functions.

8. The light controller of claim 7, wherein the plurality of functions are based on one of analog signaling and digital signaling or a combination thereof.

9. The light controller of claim 1, further comprising hardware configured to program the processor to multiplex the at least one lead.

10. A non-transitory computer-readable medium, for use with a luminaire, the computer-readable medium comprising instructions that, when executed by a processor, cause the processor to perform operations comprising:
multiplexing at least one unassigned lead of a lighting control receptacle included in the luminaire to achieve one of at least one of a plurality of functions;
wherein the operations further include dynamically multiplexing two or more functions on a single lead from among the at least one unassigned lead.

11. The non-transitory computer-readable medium of claim 10, wherein the operations include performing of a data transmission operation and a data reception operation or a combination thereof.

12. The non-transitory computer-readable medium of claim 10, wherein the lighting control receptacle is implemented according to the ANSI C136.41 standard, and wherein the at least one lead is selected from unassigned leads of the lighting control receptacle.

13. The non-transitory computer-readable medium of claim 10, wherein the receptacle includes a plurality of leads of which leads from a first set of leads are associated with one or more components of the luminaire and leads from a second set of leads are unassigned, and the at least one unassigned lead is selected from the second set of leads.

* * * * *